United States Patent [19]

Linke et al.

[11] 4,087,558

[45] May 2, 1978

[54] SWEETENING FOODS WITH NEOHESPERIDIN CHALCONE

[76] Inventors: Harald A. B. Linke, 138 Barnard St., Highland Park, N.J. 08904; Douglas E. Eveleigh, 1 Toth La., Rocky Hill, N.J. 08553

[21] Appl. No.: 667,367

[22] Filed: Mar. 16, 1976

[51] Int. Cl.² .................... A23G 3/30; A23G 9/00; A23L 1/22

[52] U.S. Cl. .................... 426/3; 426/548; 426/590; 426/660; 426/804; 424/180; 536/8

[58] Field of Search .............. 424/180; 536/8; 426/3, 426/590, 660, 804, 548

[56] References Cited

U.S. PATENT DOCUMENTS

| | | | |
|---|---|---|---|
| 3,364,196 | 1/1968 | Feldman et al. | 536/8 |
| 3,375,242 | 3/1968 | Horowitz et al. | 536/8 |
| 3,429,873 | 2/1969 | Horowitz et al. | 536/8 |
| 3,876,777 | 4/1975 | Horowitz et al. | 536/8 |
| 3,947,405 | 3/1976 | Wild et al. | 536/8 |

*Primary Examiner*—Jeanette M. Hunter

[57] ABSTRACT

The use of neohesperidin chalcone as a substitute for sugar.

1 Claim, No Drawings

SWEETENING FOODS WITH NEOHESPERIDIN CHALCONE

This invention relates to a novel process for preparing dihydrochalcone and chalcone derivatives of flavanone glycosides and to a method of using neohesperidin chalcone, one of the derivatives prepared by the above process, as a substitute for sucrose or other sweetening agents.

In U.S. Pat. No. 3,087,821, issued Apr. 30, 1963, it has been shown that dihydrochalcones of flavanone glycosides can be prepared chemically by a two-step synthesis. The first step is carried out by contacting the flavanone glycoside with a solution of alkali followed by isolation of the produced chalcone of the flavanone glycoside. In a second step the purified chalcone is contacted with hydrogen gas at atmospheric pressure in the presence of a hydrogenation catalyst followed by isolation of the dihydrochalcone. In another process, as described by L. Krbechek et al., J. Agr. Food Chem., 16, 108 (1968), the flavanone glycoside is contacted with a solution of alkali and hydrogen gas at a pressure of 50 p.s.i.g. in the presence of a hydrogenation catalyst followed by isolation of the dihydrochalcone. In both processes, during the course of isolation of the dihydrochalcone from the alkaline reaction mixture, the alkali is usually neutralized with a diluted strong acid e.g., hydrochloric acid, and then the formed salt is removed from the dihydrochalcone by recrystallization from aqueous solution.

It has now been found that dihydrochalcone derivatives can be prepared in a one-step synthesis by contacting the corresponding flavanone glycoside with alkali and hydrogen gas at atmospheric pressure in the presence of a hydrogen catalyst, usually a palladium or platinum derived preparation, followed by isolation of the dihydrochalcone. The alkali can be removed from the end product by passing the catalyst-free diluted alkaline solution through a column of any cation exchange resin, e.g., Amberlite 200, or the cation exchanger may be added directly to the alkaline solution. From the alkaline-free solution a very pure dihydrochalcone without any residual salts can be obtained. The described novel process involves neither isolation of intermediate compounds nor utilization of high pressures, and the hydrogenation catalyst is reusable.

In another embodiment of the present invention, chalcone derivatives are prepared (in a one-step synthesis) by contacting the corresponding flavanone with alkali at atmospheric pressure. The chalcone derivative so-formed may then be recovered employing the procedures set out above.

The chemical changes involved in the above syntheses are demonstrated by the following reactions:

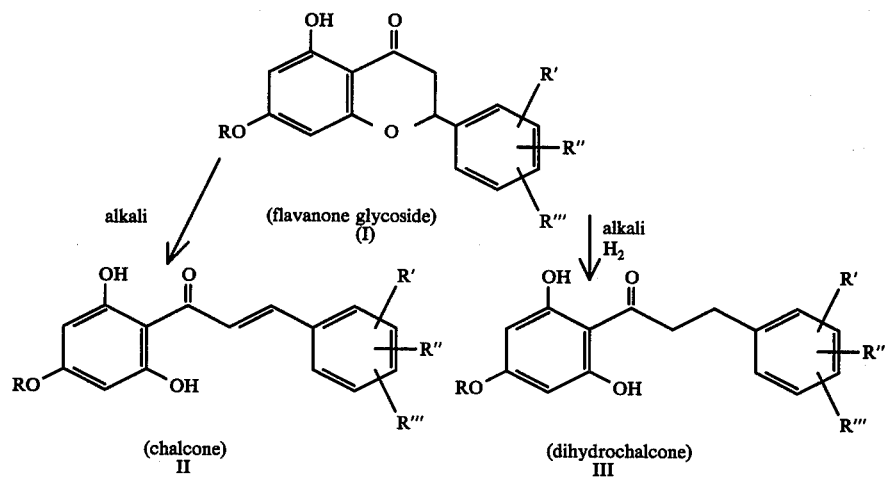

wherein R represents any natural or synthetic glycoside residue, e.g., such as the glucosyl radical and the neohesperidosyl radical, R' represents a hydroxyl radical, lower alkyl or alkoxy, and R" and R'" may be the same or different and represent hydrogen or a radical such as hydroxyl, lower alkyl or lower alkoxy; at least one of R', R" and R'" being other than hydrogen.

In carrying out the process of the invention for preparing dihydrochalcones, the flavanone glycoside is contacted with from about 5 to about 35% aqueous solution of alkali, such as alkali metal hydroxide, for example, potassium hydroxide, sodium hydroxide or lithium hydroxide; it will be understood that the alkali metal hydroxide will be employed in sufficient amount to form a dispersion with the flavanone glycoside. The hydrogen will preferably be employed in 1:1 molar quantities with the flavanone glycoside, although excess hydrogen may be employed if desired.

Where the chalcone derivative is to be formed, an aqueous solution containing from about 10 to about 50% by weight alkali metal hydroxide such as potassium hydroxide or sodium hydroxide is employed in sufficient amount to cause dissolution of the flavanone glycoside.

The term "lower alkyl" as employed herein includes straight or branched chain aliphatic hydrocarbon radicals having up to five carbon atoms, such as methyl, ethyl, propyl, isopropyl, butyl, isobutyl, t-butyl, n-pentyl and the like.

The term "lower alkoxy" as employed herein includes straight and branched chain radicals of the formula lower alkyl-O— wherein lower alkyl is as defined above, such as methoxy, ethoxy, propoxy, isopropoxy, and the like.

The flavanone glycoside starting material of structure I may be formed employing conventional techniques such as conversion of naturally available flavanone glycoside to the corresponding phloracetophenone glycoside according to the procedure described by L.

Krbechek et al., J. Agr. Food Chem., 16, 108 (1968) and condensing the phloracetophenone glycoside with the appropriately substituted aromatic aldehyde according to the procedure of J. Chopin et al., *Compt. Rend.* Series C 262 1712 (1966).

In addition, there is also provided a method of using the neohesperidin chalcone as a substitute for sucrose in foods, beverages, medicaments, vitamins, candies, chewing gum and the like. The neohesperidin chalcone has been found to be about 40–50 times as sweet as sucrose.

The following Examples represent preferred embodiments of the present invention.

EXAMPLE 1

Naringin Dihydrochalcone

Five grams of naringin are dissolved in 25 ml of a 10% aqueous solution of potassium hydroxide and hydrogenated at room temperature and at atmospheric pressure, using 500 mg palladium black as catalyst. The resultant colorless solution is diluted with water; after removal of the catalyst the solution is passed through an Amberlite 200 (Rohm & Haas) column, and the alkaline-free eluate is evaporated to dryness. White crystals of the dihydrochalcone of naringin are obtained, m.p. 169°–170° C, in a yield of 98%.

EXAMPLE 2

Neohesperidin Chalcone

One g of neohesperidin dissolved in 20 ml of KOH (25%) is magnetically stirred at room temperature for 2 hours. The reaction mixture is diluted with water to 100 ml and passed through an Amberlite 200 (Rohm & Haas) column (25 × 200 mm). The eluate (125 ml) is collected and evaporated to dryness in a rotary vacuum evaporator at 40° C; yield of the red-orange compound is 875 mg. Crude product (100 mg) is dissolved in 5 ml $H_2O$-saturated n-butanol and placed on top of a silica gel (Woelm, particle size <0.03 mm) column (25 × 160 mm) equilibrated with $H_2O$-saturated n-butanol. The column is eluted with $H_2O$-saturated n-butanol under pressure (4 psig.); the first yellow eluate is collected (30 ml) and evaporated to dryness in a rotary vacuum evaporator, m.p. 232°–233° C, in a yield of 80% of product.

What is claimed is:

1. The method of sweetening foods, which comprises incorporating neohesperidin chalcone as a sucrose substitute in a food selected from the group consisting of beverages, candy, or chewing gum, in an amount to achieve the desired sweetness level.

* * * * *